(12) United States Patent
Fan

(10) Patent No.: US 10,409,109 B2
(45) Date of Patent: Sep. 10, 2019

(54) DOUBLE-SIDED DISPLAY

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 335 days.

(21) Appl. No.: 14/771,260

(22) PCT Filed: Jul. 23, 2015

(86) PCT No.: PCT/CN2015/084928
§ 371 (c)(1),
(2) Date: Aug. 28, 2015

(87) PCT Pub. No.: WO2017/008326
PCT Pub. Date: Jan. 19, 2017

(65) Prior Publication Data
US 2017/0017122 A1    Jan. 19, 2017

(30) Foreign Application Priority Data
Jul. 15, 2015   (CN) .......................... 2015 1 0417285

(51) Int. Cl.
G02F 1/1335   (2006.01)
G02F 1/1333   (2006.01)

(52) U.S. Cl.
CPC .. G02F 1/133615 (2013.01); G02F 1/133553 (2013.01); *G02F 2001/133342* (2013.01)

(58) Field of Classification Search
CPC ......... G02F 1/133553; G02F 1/133615; G02F 2001/133342
See application file for complete search history.

(56) References Cited

U.S. PATENT DOCUMENTS 6,685,330 B2 *   2/2004   Miyazaki ............... G01D 11/28
                                                 362/23.16
7,024,809 B1 *   4/2006   Poma ..................... G02B 6/006
                                                 264/400
(Continued)

FOREIGN PATENT DOCUMENTS

CN         1638434 A      7/2005
CN       102224448 A     10/2011
(Continued)

OTHER PUBLICATIONS

Huang Yulin, (Translation of CN103676305A).*
PCT/CN2015/084928, CN, International Search Report Chinese Patent Office.

*Primary Examiner* — Anh T Mai
*Assistant Examiner* — Arman B Fallahkhair
(74) *Attorney, Agent, or Firm* — Andrew C. Cheng

(57) ABSTRACT

The present disclosure relates to liquid crystal display technology, and more particularly to a double-sided display. The double-sided display includes a first display panel, a second display panel parallel to the first display panel, and a backlight module between the first display panel and the second display panel. The backlight module includes a first optical film and a second optical film respectively arranged at internal sides of the first display panel and the second display panel, and a light guiding layer between the first optical film and the second optical film. The light guiding layer includes a first dot reflective layer and a second dot reflective layer parallel to each other, at least one light reflecting component and a light source arranged within the light reflective component. The first dot reflective layer, the second dot reflective layer and the light reflective components cooperatively form a light guiding chamber. The double-sided display includes the edge-type backlight without adopting a light guiding plate. The light beams may be (Continued)

guided via the air such that the double-sided display may be thinner and lighter.

5 Claims, 1 Drawing Sheet

(56) References Cited

U.S. PATENT DOCUMENTS

| | | | | |
|---|---|---|---|---|
| 7,796,215 | B2* | 9/2010 | Misono | G02B 6/005 349/56 |
| 8,591,052 | B2* | 11/2013 | Wheatley | G02B 6/0035 345/102 |
| 8,773,614 | B2* | 7/2014 | Han | G02F 1/1333 349/62 |
| 2002/0064037 | A1* | 5/2002 | Lee | G02F 1/133615 362/614 |
| 2012/0140513 | A1* | 6/2012 | Shibata | G02B 6/0035 362/602 |
| 2015/0036319 | A1* | 2/2015 | Ning | G02F 1/133608 362/97.1 |
| 2015/0338569 | A1* | 11/2015 | Haiby | G02B 6/0076 362/616 |

FOREIGN PATENT DOCUMENTS

| | | |
|---|---|---|
| CN | 102566141 A | 7/2012 |
| CN | 103675987 A | 3/2014 |
| CN | 103676305 A | 3/2014 |
| CN | 1584065 A | 1/2015 |
| JP | 2005191818 A | 7/2005 |

\* cited by examiner

DOUBLE-SIDED DISPLAY

BACKGROUND OF THE INVENTION

1. Field of the Invention

The present disclosure relates to liquid crystal display technology, and more particularly to a double-sided display.

2. Discussion of the Related Art

Conventional TFT-LCDs generally need external light source to display due to the TFT-LCD panel does not emit lights itself. The light source includes a backlight source and a reflective source. As the backlight source may not be affected by environmental changes, and thus the backlight source has been adopted as the light source of TFT-LCDs.

Among the TFT-LCD light sources, the light source evolves from CCFLs to LEDs. The LEDs have been characterized by attributes, such as small size, short response time, long life cycle, robust, wide color range and may be packaged, and thus are the main trend of backlight source.

LED backlight basically includes edge-type backlight and direct-type backlight.

Edge-type backlight includes the attributes such as low power consumption and thin thickness. However, it is necessary to adopt the light guiding plate, which results in heavy weight and high cost. With respect to the direct-type backlight, as the number of light source is small and no light guiding plate is needed, and thus the cost is low. However, the outlook may be thick due to the light box.

For conventional double-sided display, the height of the light box of the direct-type backlight is large. In addition, the edge-type backlight needs two light guiding plates, which results in a heavy weight.

SUMMARY

In order to overcome the above-mentioned problems, the double-sided display adopt the edge-type backlight so as to make the display thinner. In addition, the double-sided display does not include the light guiding plate, which ensures a lighter weight.

In one aspect, a double-sided display includes: a first display panel, a second display panel parallel to the first display panel, and a backlight module between the first display panel and the second display panel; the backlight module includes a first optical film and a second optical film respectively arranged at internal sides of the first display panel and the second display panel, and a light guiding layer between the first optical film and the second optical film; the light guiding layer comprises: a first dot reflective layer and a second dot reflective layer respectively arranged at internal sides of the first optical film and the second optical film; wherein the first dot reflective layer and the second dot reflective layer face toward each other; and at least one light reflective component and a light source arranged within the light reflective component, the light reflective component is arranged between the first dot reflective layer and the second dot reflective layer, and is arranged at one end of the light guiding layer; and the first dot reflective layer, the second dot reflective layer and the light reflective components cooperatively form a light guiding chamber.

Wherein the light guiding layer further includes at least one supporting pillar between the first dot reflective layer and the second dot reflective layer such that the first dot reflective layer and the second dot reflective layer are parallel to each other.

Wherein a distance between the first dot reflective layer and the second dot reflective layer is in a range between 10 mm and 40 mm.

Wherein the first dot reflective layer and/or the second dot reflective layer comprise a transparent base layer and a reflective layer distributed on the transparent base layer, and the two reflective layers correspond to each other such that light beams emitted from the light source emit out from the transparent base layer or are reflected by surfaces of the reflective layers.

Wherein the transparent base layer is made by any one of polymethyl methacrylate (PPMA), silicone modified polyether (MS), polystyrene (PS), glass, polycarbonate (PC), and polyethylene terephthalate (PET), and the reflective layer is made by any one of calcium carbonate, barium sulfate, magnesium oxide, silver, aluminium, and polytetrafluoroethylene (PTFE) suspension resin.

Wherein the first dot reflective layer and/or the second dot reflective layer includes an non-transparent substrate having through holes arranged thereon such that the light beams emitted from the light source emit out from the through holes or are reflected by a surface of the non-transparent substrate.

Wherein a diameter of the through holes is less than 1 mm.

Wherein the light reflective component is a reflector or a light reflective plate.

Wherein a cross section of the reflector is a parabola with an opening facing toward an internal side of the light guiding chamber.

Wherein the light source is a LED light source.

In view of the above, the double-sided display is accomplished by adopting edge-type backlight cooperatively with a light guiding layer such that the light is guided via air. Compared to the direct-type backlight of conventional double-sided display, the claimed double-sided display is thinner. At the same time, the light guiding plate is no longer need such that the weight of the double-sided display may be reduced.

DETAILED DESCRIPTION OF THE EMBODIMENTS

Figure 1:
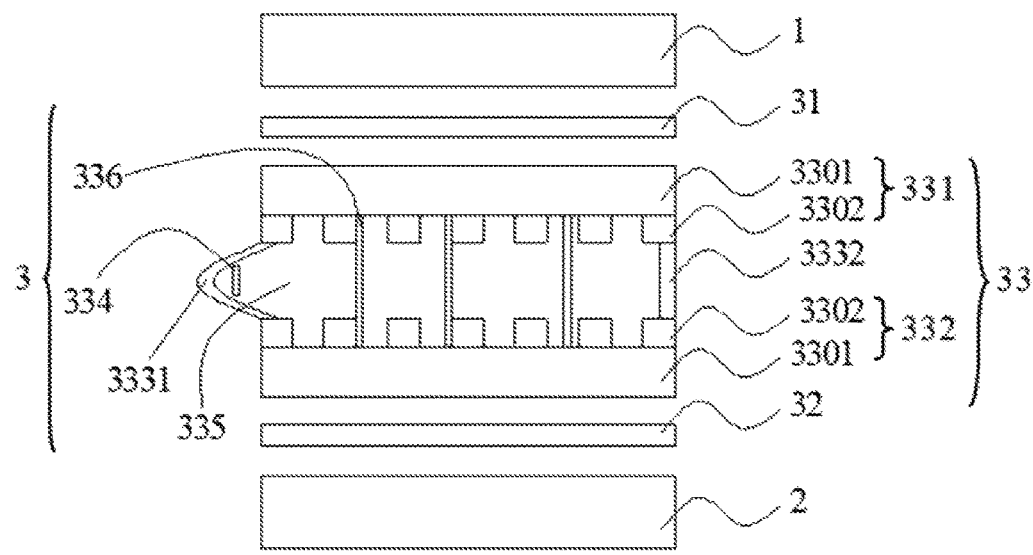
FIG. 1 is a cross-sectional view of the double-sided display in accordance with a first embodiment.

Various example embodiments will now be described more fully with reference to the accompanying drawings in which some example embodiments are shown. In the drawings, the thicknesses of layers and regions may be exaggerated for clarity. In the following description, in order to avoid the known structures and/or functions unnecessary detailed description of the concept of the invention result in confusion, well-known structures may be omitted and/or functions described in unnecessary detail.

It should be noted that the relational terms herein, such as "first" and "second", are used only for differentiating one entity or operation, from another entity or operation, which, however do not necessarily require or imply that there should be any real relationship or sequence.

FIG. 1 is a cross-sectional view of the double-sided display in accordance with a first embodiment. The double-sided display of the first embodiment includes a first display panel 1, a second display panel 2, and a backlight module 3 between the first display panel 1 and the second display panel 2. The first display panel 1 and the second display panel 2 are parallel to each other.

Specifically, the backlight module 3 includes a first optical film 31 and a second optical film 32 parallel to each other. The first optical film 31 and the second optical film 32 are respectively arranged at internal sides of the first display panel 1 and the second display panel 2. The backlight module 3 further includes a light guiding layer 33 between the first optical film 31 and the second optical film 32.

Specifically, the light guiding layer 33 includes a first dot reflective layer 331 and a second dot reflective layer 332 parallel to each other. The first dot reflective layer 331 and the second dot reflective layer 332 are respectively arranged at the internal sides of the first optical film 31 and the second optical film 32. The first dot reflective layer 33 further includes at least one light reflecting component between the first dot reflective layer 331 and the second dot reflective layer 332, and a light source 334 arranged within the light reflecting component.

That is, the light source 334 is an edge-type light source. In this way, the first dot reflective layer 331, the second dot reflective layer 332, and the two light reflecting components cooperatively form a light guiding chamber 335. The light reflecting component may be a reflector 3331 or a light reflective plate 3332. In the embodiment, the light reflecting components located between the first dot reflective layer 331 and the second dot reflective layer 332 are one reflector 3331 and one light reflective plate 3332 arranged at two horizontal ends of the light guiding layer. The reflector 3331 and the light reflective plate 3332 are opposite to each other. The light source 334 is arranged within the reflector 3331. The reflector 3331 includes a parabola-shaped cross section, and an opening of the parabola faces toward an internal side of the light guiding chamber 335.

In the embodiment, the light source 334 is arranged in a bottom of the reflector 3331, and the light source 334 may be, but not limited to, a LED light source.

The arrangement of the reflector 3331 may convert the long bright LED lights emitted by the light source 334 into a collimated light source so as to reduce the light-emitting angle. At the same time, by adopting the light guiding layer 33, the lights may be guided by the air within the light guiding chamber 335 such that the light guiding plate is not needed. In this way, the weight of the double-sided display is prevented from being increased even the edge-type light source is adopted.

In the embodiment, the first dot reflective layer 331 and the second dot reflective layer 332 area include a transparent base layer 3301 and a reflective layer 3302 distributed on the transparent base layer 3301. In addition, the reflective layer 3302 is arranged at an internal surface of the transparent base layer 3301 facing toward the light guiding chamber 335.

The transparent base layer 3301 may be made by any one of polymethyl methacrylate (PPMA), silicone modified polyether (MS), polystyrene (PS), glass, polycarbonate (PC), and polyethylene terephthalate (PET). The reflective layer 3302 may be made by any one of calcium carbonate, barium sulfate, magnesium oxide, silver, aluminium, polytetrafluoroethylene (PTFE) suspension resin, or other optical films with high reflective rate. In the embodiment, the first dot reflective layer 331 and the second dot reflective layer 332 are made by the transparent base layer 3301 of PMMA material and the reflective layer 3302 of barium sulfate material.

In addition, in order to guarantee the dimension of the light guiding layer 33, that is, a distance between the first dot reflective layer 331 and the second dot reflective layer 332, the light guiding layer 33 further includes at least one supporting pillars 336 between the first dot reflective layer 331 and the second dot reflective layer 332. In the embodiment, three supporting pillars 336 are arranged uniformly between the light reflective plate 3332 and an opening of the reflector 3331 within the light guiding chamber 335. In an example, the distance between the first dot reflective layer 331 and the second dot reflective layer 332 may be in a range between 10 mm and 40 mm.

The operating principles of the double-sided display will be described hereinafter.

First, the light source 334 in the bottom of the reflector 3331 emits LED light beams. The LED light beams are reflected by the reflector 3331 such that the light-emitting angle is reduced. The LED light beams are propagated within the light guiding chamber 335. A portion of the LED light beams may propagate between the reflective layers 3302 and then on the transparent base layer 3301, the LED light beams then propagate to the first optical film 31 and/or the second optical film 32 via the transparent base layer 3301, and then perform display via the first display panel 1 and the second display panel 2. When the other portion of the LED light beams propagate to the reflective layer 3302 made by high-reflective-rate material, the LED light beams are reflected. The above process may be repeated until the LED light beams propagate from the transparent base layer 3301 between the reflective layers 3302 toward the first optical film 31 and/or the second optical film 32, and then perform display via the first display panel 1 and the second display panel 2.

Figure 2:
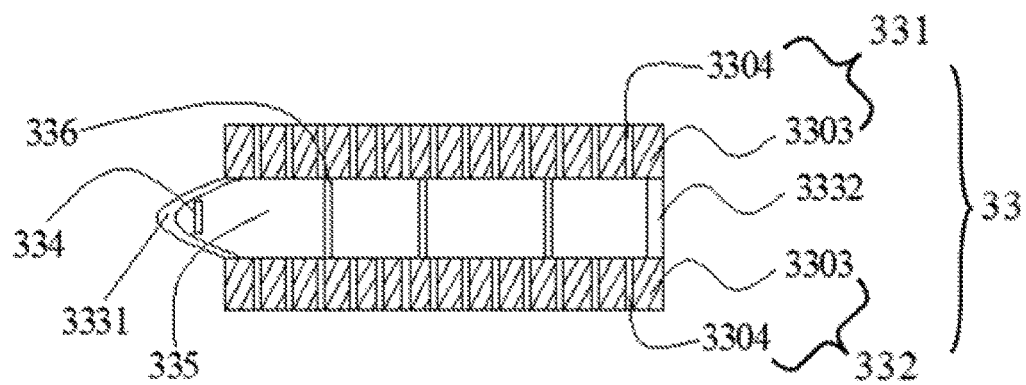
FIG. 2 is a cross-sectional view of the light guiding layer in accordance with a second embodiment.

FIG. 2 is a cross-sectional view of the light guiding layer in accordance with a second embodiment. The configuration of the second embodiment similar to that of the first embodiment will be omitted, that is, only the difference between the first and the second embodiment will be described hereinafter. Referring to FIG. 2, a plurality of through holes 3304 are arranged on an non-transparent substrate 3303 of the first dot reflective layer 331 and the second dot reflective layer 332 such that a portion of the emitted light beams of the light source 334 may emit out via the through holes 3304. The other portion of the emitted light beams may propagate into the non-transparent substrate 3303 and may be reflected by a surface of the non-transparent substrate 3303. The light beams may be repeatedly reflected until being emitted out via the through holes 3304. Afterward, the light beams are propagated into the first optical film 31 and/or the second optical film 32 and may perform display via the first display panel 1 and/or the second display panel 2. Thus, the light beams emitted by the light guiding layer 33 may be more uniform. Generally, a diameter of the through holes 3304 is less than 1 mm, and the non-transparent substrate 3303 may be the non-transparent substrate, such as a white board or a galvanized plate such that the emitting light beams are reflected on the surface of the non-transparent substrate 3303, instead of being emitted out.

In view of the above, the double-sided display includes the edge-type light source 334, which contributes to make the double-sided display thinner. At the same time, the double-sided display does not have to adopt the light guiding plate, which is generally needed for conventional double-sided displays. Instead, the light guiding layer 33 is configured, and the light guiding chamber 335 is formed within the light guiding layer 33. In this way, the light beams may be guided via the air within the light guiding chamber 335, and thus the weight of the double-sided display is reduced. In conclusion, the claimed double-sided display is thinner and lighter than conventional ones. In addition, during the reflective process, the light beams may be emitted out or be reflected via the first dot reflective layer 331 and/or the second dot reflective layer 332, which ensures that the light beams emitted from the light guiding layer 33 may be more uniform. As such, the display performance on the first display panel 1 and/or the second display panel 2 may be substantially same with the conventional double-sided display.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A double-sided display, comprising:

a first display panel, a second display panel parallel to the first display panel, and a backlight module between the first display panel and the second display panel; the backlight module comprises a first optical film and a second optical film respectively arranged at internal sides of the first display panel and the second display panel, and a light guiding layer between the first optical film and the second optical film, the light guiding layer comprises:

a first partially reflective layer and a second partially reflective layer respectively arranged at internal sides of the first optical film and the second optical film;

wherein the first partially reflective layer and the second partially reflective layer face toward each other, each of the first partially reflective layer and the second partially reflective layer comprises a transparent base layer and a reflective layer distributed on a surface of the transparent base layer, such that the reflective layers of the first and second partially reflective layers face each other;

light reflective components including a reflector and a reflective plate arranged at opposite ends of the light guiding layer between the first partially reflective layer and the second partially reflective layer, such that the first partially reflective layer, the second partially reflective layer and the light reflective components cooperatively form a light guiding chamber;

a light source arranged at one end of the light guiding layer to illuminate the light guiding chamber; and the light guiding layer further comprises at least one supporting pillar between the first partially reflective layer and the second partially reflective layer, wherein one end of the at least one supporting pillar connects to the first partially reflective layer and the other end of the supporting pillar connects to the second partially reflective layer, such that the first partially reflective layer and the second partially reflective layer are parallel to each other.

2. The double-sided display as claimed in claim 1, wherein a distance between the first partially reflective layer and the second partially reflective layer is in a range between 10 mm and 40 mm.

3. The double-sided display as claimed in claim 1, wherein the transparent base layer is made by any one of polymethyl methacrylate (PPMA), silicone modified polyether (MS), polystyrene (PS), glass, polycarbonate (PC), and polyethylene terephthalate (PET), and the reflective layer is made by any one of calcium carbonate, barium sulfate, magnesium oxide, silver, aluminum, and polytetrafluoroethylene (PTFE) suspension resin.

4. The double-sided display as claimed in claim 1, wherein a cross section of the reflector is a parabola with an opening facing toward an internal side of the light guiding chamber.

5. The double-sided display as claimed in claim 1, wherein the light source is a LED light source.

* * * * *